US012803299B2

(12) United States Patent
Ito et al.

(10) Patent No.: US 12,803,299 B2
(45) Date of Patent: Nov. 17, 2026

(54) ELECTRIC POWER SUPPLY: SYSTEM

(71) Applicant: TOYOTA JIDOSHA KABUSHIKI KAISHA, Toyota (JP)

(72) Inventors: Koji Ito, Nagoya (JP); Taisuke Kurachi, Kariya (JP); Kimikazu Nakamura, Kariya (JP); Yoshinori Morita, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 19/170,371

(22) Filed: Apr. 4, 2025

(65) Prior Publication Data

US 2025/0330027 A1 Oct. 23, 2025

(30) Foreign Application Priority Data

Apr. 17, 2024 (JP) ................................ 2024-066924

(51) Int. Cl.
*H02J 7/50* (2026.01)
*H02J 7/00* (2026.01)
*H02J 7/90* (2026.01)

(52) U.S. Cl.
CPC ................ *H02J 7/50* (2026.01); *H02J 7/855* (2026.01); *H02J 7/90* (2026.01); *H02J 2207/20* (2020.01)

(58) Field of Classification Search
CPC ...... H02J 7/50; H02J 7/90; H02J 7/855; H02J 2207/20
USPC ........................................................... 307/52
See application file for complete search history.

(56) References Cited

U.S. PATENT DOCUMENTS

| | | | | |
|---|---|---|---|---|
| 2019/0334442 | A1 | 10/2019 | Iyasu et al. | |
| 2021/0170884 | A1 | 6/2021 | Sakakibara | |
| 2024/0063723 | A1 * | 2/2024 | Blinov ................ | H02M 1/0048 |

FOREIGN PATENT DOCUMENTS

| | | | |
|---|---|---|---|
| JP | 2018-117454 | A | 7/2018 |
| JP | 2018-157737 | A | 10/2018 |
| JP | 2018157737 | * | 10/2018 |
| JP | 2021-093775 | A | 6/2021 |

* cited by examiner

*Primary Examiner* — Michael R. Fin
(74) *Attorney, Agent, or Firm* — Sughrue Mion, PLLC

(57) ABSTRACT

An electric power supply system includes: a high-voltage battery; a low-voltage battery having a nominal voltage lower than that of the high-voltage battery, the low-voltage battery being electrically connected to a load; a first converter electrically connected between the high-voltage battery and the low-voltage battery, the first converter being configured to perform voltage conversion between the high-voltage battery and the low-voltage battery; a second converter electrically connected between the high-voltage battery and the low-voltage battery, the second converter being configured to perform voltage conversion between the high-voltage battery and the low-voltage battery, the second converter having rated electric power lower than that of the first converter; and a control device that controls operations of the first converter and the second converter. The control device can selectively execute a plurality of operation modes depending on a total value of output currents of the first converter and the second converter.

3 Claims, 5 Drawing Sheets

ELECTRIC POWER SUPPLY: SYSTEM

CROSS-REFERENCE TO RELATED APPLICATION

This application claims priority to Japanese Patent Application No. 2024-066924 filed on Apr. 17, 2024, incorporated herein by reference in its entirety.

BACKGROUND

1. Technical Field

The technique disclosed in the present specification relates to an electric power supply system.

2. Description of Related Art

Japanese Unexamined Patent Application Publication No. 2018-117454 (JP 2018-117454 A) describes an electric power supply system. The electric power supply system includes: a battery that supplies electric power to a load; a first converter that performs voltage conversion between the load and the battery; a second converter that performs voltage conversion between the load and the battery, the second converter having rated electric power lower than that of the first converter; and a control device that controls operations of the first converter and the second converter. The control device is configured to operate any one of or both of the first converter and the second converter depending on a magnitude of an output current to the load.

SUMMARY

In the above-mentioned electric power supply system, the first converter is used when the output current to the load falls within a first range, and the second converter is used when the output current to the load falls within a second range lower than the first range. In this manner, the voltage conversion efficiency is improved. However, in an intermediate region positioned at a boundary between the first range and the second range, reduction in the voltage conversion efficiency cannot be avoided even when any one of the first converter and the second converter is used.

In view of the above-mentioned circumstance, the present specification provides a technique for improving the voltage conversion efficiency in an electric power supply system.

The technique disclosed by the present specification is embodied as an electric power supply system for supplying electric power to a load. The electric power supply system includes: a high-voltage battery; a low-voltage battery having a nominal voltage lower than a nominal voltage of the high-voltage battery, the low-voltage battery being electrically connected to the load; a first converter electrically connected between the high-voltage battery and the low-voltage battery, the first converter being configured to perform voltage conversion between the high-voltage battery and the low-voltage battery; a second converter electrically connected between the high-voltage battery and the low-voltage battery, the second converter being configured to perform voltage conversion between the high-voltage battery and the low-voltage battery, the second converter having rated electric power lower than rated electric power of the first converter; and a control device that controls operations of the first converter and the second converter. The control device is configured to selectively execute a plurality of operation modes depending on a total value of output currents of the first converter and the second converter. The operation modes include: a first operation mode that is selectable when the total value of the output currents falls within a first current range, the first operation mode being an operation mode in which only the first converter supplies the electric power; a second operation mode that is selectable when the total value of the output currents falls within a second current range that is lower than the first current range, the second operation mode being an operation mode in which only the second converter supplies the electric power; and a third operation mode that is selectable when the total value of the output currents falls within a third current range positioned between the first current range and the second current range, the third operation mode being an operation mode in which electric power supply from the first converter and the second converter is not performed.

It is to be noted that, in the first operation mode, in order to cause only the first converter to supply the electric power, the operation of the second converter may be stopped. Alternatively, the output voltage of the second converter may be set to a value lower than the output voltage of the first converter so that the electric power supply by the second converter may be substantially stopped. Similarly, in the second operation mode, in order to cause only the second converter to supply the electric power, the operation of the first converter may be stopped. Alternatively, the output voltage of the first converter may be set to a value lower than the output voltage of the second converter so that the electric power supply by the first converter may be substantially stopped.

In the above-mentioned configuration, when the total value of the output currents falls within a relatively high region (first current range), the electric power is supplied from the first converter having large rated electric power, and, when the total value of the output currents falls within a relatively low region (second current range), the electric power is supplied from the second converter having small rated electric power. In this manner, the voltage conversion efficiency in the electric power supply system can be enhanced. Further, when the total value of the output currents falls within an intermediate region between those regions (third current range), since both of the first converter and the second converter are reduced in voltage conversion efficiency, electric power supply from the first converter and the second converter is not performed, and the electric power is supplied from the low-voltage battery to the load. In this manner, even when the total value of the output currents falls within the intermediate region (third current range), the reduction in voltage conversion efficiency can be avoided.

In one embodiment of the present technique, the control device may be configured to prohibit execution of the third operation mode regardless of the total value of the output currents when a deterioration index of the low-voltage battery falls within a predetermined deterioration range. With such a configuration, even when the total value of the output currents falls within the third current range, the electric power is supplied from the high-voltage battery to the load without stopping the operation of at least one of the first converter and the second converter. In this manner, when the deterioration of the low-voltage battery is severe, the discharge of the low-voltage battery is prohibited or restrained so that further deterioration of the low-voltage battery is prevented.

In one embodiment of the present technique, the operation modes may further include a fourth operation mode and a fifth operation mode. The fourth operation mode is an operation mode that is selectable when the total value of the output currents falls within the third current range, and is an operation mode in which only the first converter intermittently supplies the electric power. The fifth operation mode is similarly an operation mode that is selectable when the total value of the output currents falls within the third current range, and is an operation mode in which the second converter supplies the electric power and the first converter intermittently supplies the electric power. In this case, when the deterioration index of the low-voltage battery falls within the predetermined deterioration range, the control device may execute any one of the fourth operation mode and the fifth operation mode depending on a degree of deterioration indicated by the deterioration index.

With the above-mentioned configuration, the fourth operation mode is selected when the degree of deterioration of the low-voltage battery is relatively small. In the fourth operation mode, the first converter intermittently supplies the electric power. Thus, even when the total value of the output currents falls within the intermediate region (third current range), the first converter can be operated at an operation point having a high voltage conversion efficiency. At this time, the low-voltage battery is complementarily discharged in accordance with the intermittent electric power supply of the first converter. Thus, a required current is supplied to the load. Meanwhile, in the fifth operation mode, as compared to the fourth operation mode, the electric power supply by the second converter is added. The discharge current of the low-voltage battery is reduced by the amount of the current output from the second converter, and hence further deterioration of the low-voltage battery is prevented.

In one embodiment of the present technique, the electric power supply system may include: a high-voltage battery; a low-voltage battery having a nominal voltage lower than a nominal voltage of the high-voltage battery, the low-voltage battery being electrically connected to the load; a first converter electrically connected between the high-voltage battery and the low-voltage battery, the first converter being configured to perform voltage conversion between the high-voltage battery and the low-voltage battery; a second converter electrically connected between the high-voltage battery and the low-voltage battery, the second converter being configured to perform voltage conversion between the high-voltage battery and the low-voltage battery, the second converter having rated electric power lower than rated electric power of the first converter; and a control device that controls operations of the first converter and the second converter. The control device is configured to selectively execute a plurality of operation modes depending on a total value of output currents of the first converter and the second converter. The operation modes may include a sixth operation mode that is selectable when the total value of the output currents falls within a fourth current range, the sixth operation mode being an operation mode in which electric power supply from the first converter and the second converter is not performed.

With the above-mentioned configuration, when the total value of the output currents falls within a very low region (fourth current range), the voltage conversion efficiency is reduced even with the use of the second converter having small rated electric power. In such a situation, the electric power supply by the first converter and the second converter is stopped so that the electric power can be supplied to the load from the low-voltage battery. In this manner, even when the total value of the output currents falls within a very low region (fourth current range), the reduction in voltage conversion efficiency can be avoided.

In one embodiment of the present technique, the control device may be configured to execute a deterioration determination process of calculating any one or more of an internal resistance of the low-voltage battery and a capacitance of the low-voltage battery as the deterioration index of the low-voltage battery. In this case, the control device may be configured to further operate the second converter when the deterioration determination process is executed during execution of the first operation mode to supply a charging current or a discharging current to the low-voltage battery. Alternatively, the control device may be configured to further operate the first converter when the deterioration determination process is executed during execution of the second operation mode to supply the charging current or the discharging current to the low-voltage battery.

When the current flowing through the low-voltage battery varies at the time of calculating the internal resistance of the low-voltage battery, incorrect calculation of the internal resistance may be performed. The same holds true also for the capacitance of the low-voltage battery. Regarding this point, with the above-mentioned configuration, when the converter that is not in use out of the first converter and the second converter is additionally operated, regardless of the variation in power consumption caused by the auxiliary equipment, a stable current can be supplied to the low-voltage battery. In this manner, the internal resistance of the low-voltage battery and the like can be correctly calculated, and the degree of deterioration of the low-voltage battery can be more accurately determined.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

First Embodiment

With reference to the drawings, an electric power supply system 2 of a first embodiment is described. As an example, the electric power supply system 2 of the first embodiment can be adopted in an electrified vehicle (BEV: battery electric vehicle). Further, the configuration described in this embodiment can be similarly adopted as a power supply for, other than the electrified vehicle, other types of device and equipment that use electric power as a motive power source.

Figure 1:
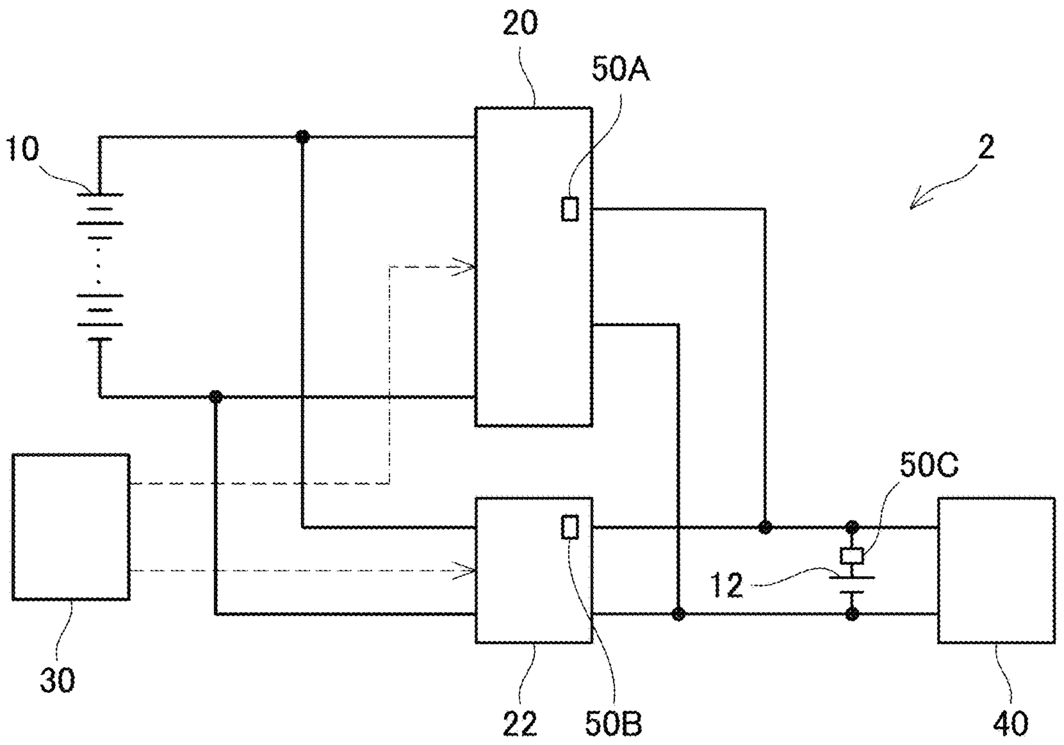
FIG. 1 is a block diagram illustrating a configuration of an electric power supply system 2 in this embodiment.

As illustrated in FIG. 1, the electric power supply system 2 includes a high-voltage battery 10, a low-voltage battery 12, a first converter 20, a second converter 22, a control device 30, an electrical load 40, and current sensors 50A, 50B, 50C. The high-voltage battery 10 is a battery having a high voltage, and supplies electric power to the electrical load 40. It is to be noted that the term "high voltage" used herein means a nominal voltage exceeding DC 60 V. The high-voltage battery 10 includes a plurality of secondary battery cells, and is configured to be charged and discharged. The secondary battery cell may be, although not particularly limited to, for example, a lithium ion battery or an all-solid-state battery. The low-voltage battery 12 is a battery having a nominal voltage lower than the nominal voltage of the high-voltage battery 10. The low-voltage battery 12 can supply electric power to the electrical load 40 similarly to the high-voltage battery 10. The low-voltage battery 12 may be, although not particularly limited to, for example, a lead storage battery.

The first converter 20 (hereinafter described as "first DDC 20") is electrically connected between the high-voltage battery 10 and the low-voltage battery 12. The first DDC 20 is configured to step down the voltage of the output electric power output from the high-voltage battery 10 between the high-voltage battery 10 and the low-voltage battery 12. It is to be noted that the specific configuration of the first DDC 20 is not particularly limited. As an example, the first DDC 20 may be a non-isolated converter using a switching element and a coil.

Figure 2:
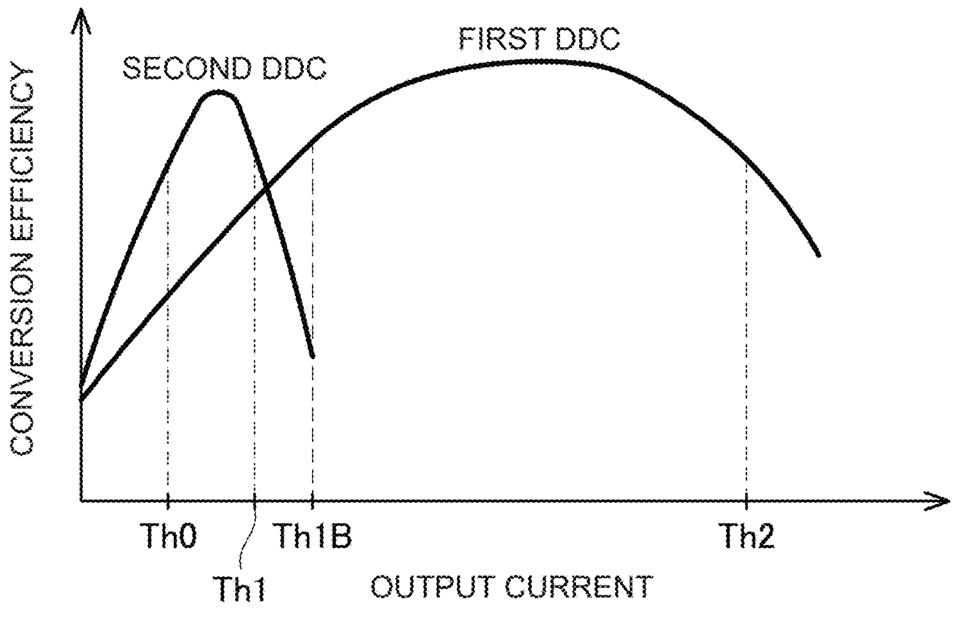
FIG. 2 is a graph illustrating a relationship between an output current of each of a first converter 20 and a second converter 22 and a voltage conversion efficiency in this embodiment.

The second converter 22 (hereinafter described as "second DDC 22") is electrically connected between the high-voltage battery 10 and the low-voltage battery 12 similarly to the first DDC 20. The second DDC 22 is configured to step down the voltage of the output electric power output from the high-voltage battery 10 between the high-voltage battery 10 and the low-voltage battery 12, similarly to the first DDC 20. The second DDC 22 is configured to have rated electric power that is smaller than rated electric power of the first DDC 20. As illustrated in the graph of FIG. 2, the first DDC 20 and the second DDC 22 respectively have different voltage conversion efficiencies with respect to each output current value. As illustrated in the graph of FIG. 2, as compared to the first DDC 20, the second DDC 22 has a high voltage conversion efficiency in a region in which an output current value is low (from Th0 to Th1), and the first DDC 20 has a high voltage conversion efficiency in an output current value region higher than the second DDC 22 (from Th1B to Th2).

The control device 30 controls the operations of the first DDC 20 and the second DDC 22. That is, the control device 30 can control the operations of the first DDC 20 and the second DDC 22 so as to adjust the voltage and the current output from each of the first DDC 20 and the second DDC 22. Further, the rated electric power is different between the first DDC 20 and the second DDC 22 in this embodiment, and hence the voltage conversion efficiency can be improved by switching the operations of the respective DDCs depending on the output current value region having a high voltage conversion efficiency. The control device 30 is connected to the first DDC 20 and the second DDC 22 via signal lines. Further, the control device 30 is also connected to the current sensors 50A, 50B, 50C via signal lines, and monitors the first DDC 20 and the second DDC 22 and also an output current value of the low-voltage battery 12 and an output voltage value from a voltage sensor (not illustrated) provided in the low-voltage battery 12. The control device 30 in this embodiment includes a processor and a memory (not illustrated). The control device 30 executes various programs stored in the memory by the processor to control the operations of the first DDC 20 and the second DDC 22.

The electrical load 40 is a device to be driven by the electric power supplied from the high-voltage battery 10 or the low-voltage battery 12. The specific configuration of the electrical load 40 is not particularly limited. As an example, the electrical load 40 is a drive device for an electrified vehicle, and can include an electric motor that drives wheels and an inverter that controls electric power to be supplied to the electric motor.

The current sensors 50A, 50B, 50C are devices that respectively detect current values output from the first DDC 20, the second DDC 22, and the low-voltage battery 12. The specific configurations of the current sensors 50A, 50B, 50C are not particularly limited.

Figure 3:
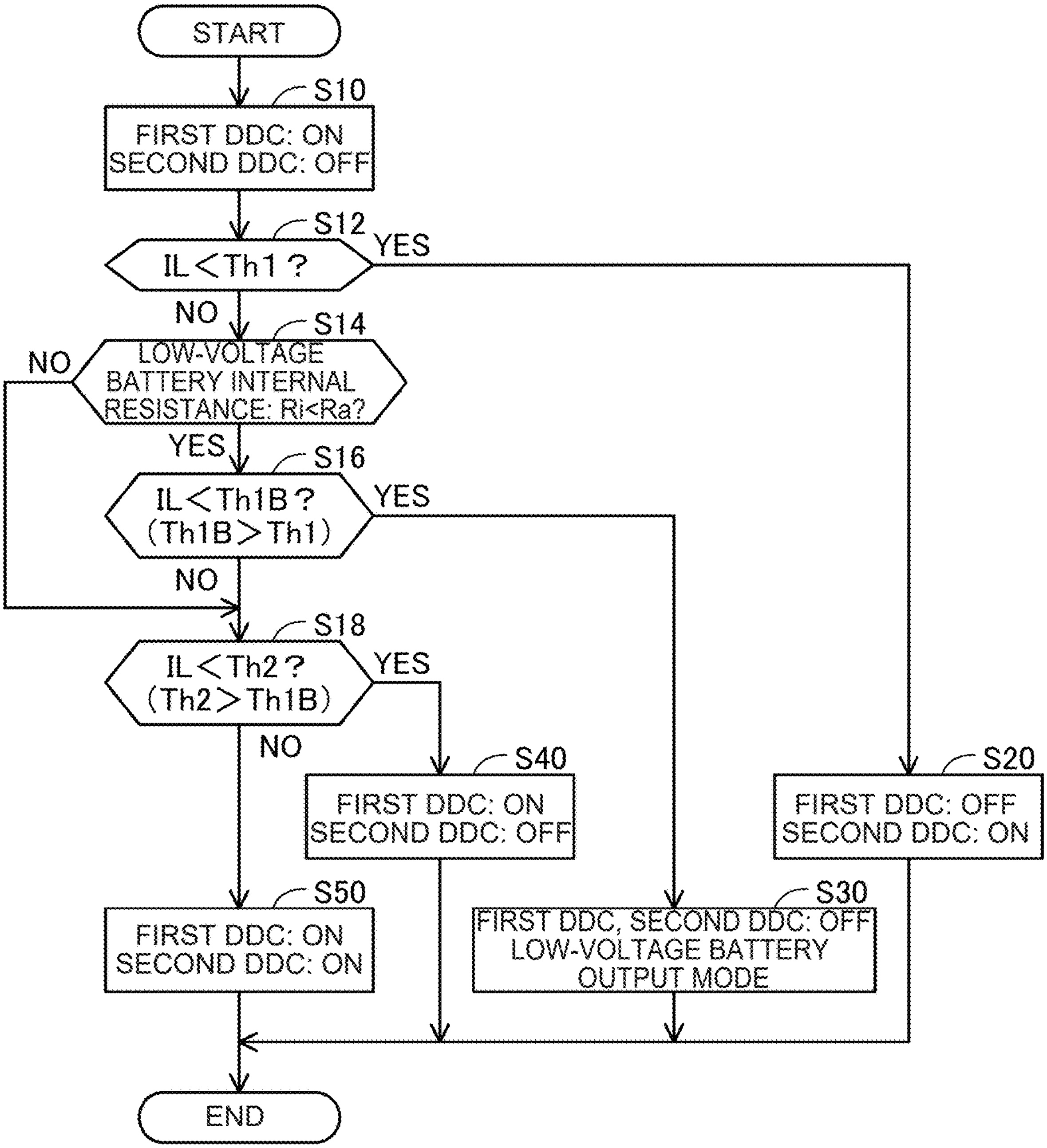
FIG. 3 is a flowchart illustrating a series of processes executed by a control device 30 in the electric power supply system 2 in a first embodiment.

With reference to FIG. 3, description is given of a series of processes executed by the control device 30 in the electric power supply system 2 of the first embodiment. The control device 30 is configured to start the series of processes illustrated in FIG. 3 at the time of supplying electric power to the electrical load 40 from the high-voltage battery 10 of the electric power supply system 2. First, the electric power supply system 2 starts electric power supply to the electrical load 40 while performing voltage conversion of electric power output from the high-voltage battery 10 by operating the first DDC 20 (S10). After that, the control device 30 determines whether or not a total value (IL) of output currents of the first DDC 20 and the second DDC 22 is less than a first current value (Th1) (S12). When the total value of the output currents of the first DDC 20 and the second DDC 22 is less than the first current value (IL<Th1) (S12: Yes), the control device 30 stops the operation of the first DDC 20 and starts the operation of the second DDC 22 to start electric power supply to the electrical load 40 while performing voltage conversion of the electric power output from the high-voltage battery 10 (S20). Meanwhile, when the total value of the output currents of the first DDC 20 and the second DDC 22 is equal to or more than the first current value (IL≥Th1) (S12: No), the control device 30 determines whether or not an internal resistance value (Ri) of the low-voltage battery 12 is less than a first resistance value (Ra) (S14).

When the internal resistance value of the low-voltage battery 12 is equal to or more than the first resistance value (Ri≥Ra) (S14: No), the control device 30 advances the process to the process of step S18 and the subsequent steps described in the following paragraphs. When the internal resistance value of the low-voltage battery 12 is less than the first resistance value (Ri<Ra) (S14: Yes), the control device 30 determines whether or not the total value of the output currents of the first DDC 20 and the second DDC 22 is less than a second current value (Th1B) (S16). It is to be noted that the second current value is set to be larger than the first current value described in the paragraph above (that is, Th1B>Th1). When the total value of the output currents of the first DDC 20 and the second DDC 22 is less than the second current value (IL<Th1B) (S16: Yes), the control device 30 stops the operations of the first DDC 20 and the second DDC 22, and starts a low-voltage battery output mode of supplying electric power to the electrical load 40 by causing the low-voltage battery 12 to output the electric power (S30). Details of the low-voltage battery output mode are described in the following paragraphs with reference to FIG. 4.

Meanwhile, when the total value of the output currents of the first DDC 20 and the second DDC 22 is equal to or more than the second current value ($IL \geq Th1B$) (S16: No), the control device 30 determines whether or not the total value of the output currents of the first DDC 20 and the second DDC 22 is less than a third current value (Th2) (S18). It is to be noted that the third current value is set to be larger than the second current value described in the paragraph above (that is, $Th2 > Th1B$). When the total value of the output currents of the first DDC 20 and the second DDC 22 is less than the third current value ($IL < Th2$) (S18: Yes), the control device 30 continues the operation of the first DDC 20 to continue the electric power supply to the electrical load 40 while performing voltage conversion of the electric power output from the high-voltage battery 10 (S40). Further, when the total value of the output currents of the first DDC 20 and the second DDC 22 is equal to or more than the third current value ($IL \geq Th2$) (S18: No), the control device 30 operates both of the first DDC 20 and the second DDC 22 to supply electric power to the electrical load 40 while performing voltage conversion of the electric power output from the high-voltage battery 10 (S50). When the process of each of steps S20, S30, S40, S50 is started, the electric power supply system 2 ends a series of process procedures illustrated in FIG. 3 (END). Further, after the series of process procedures illustrated in FIG. 3 are ended (END), the electric power supply system 2 may restart a series of process procedures illustrated in FIG. 3 again from step S12.

Figure 4:
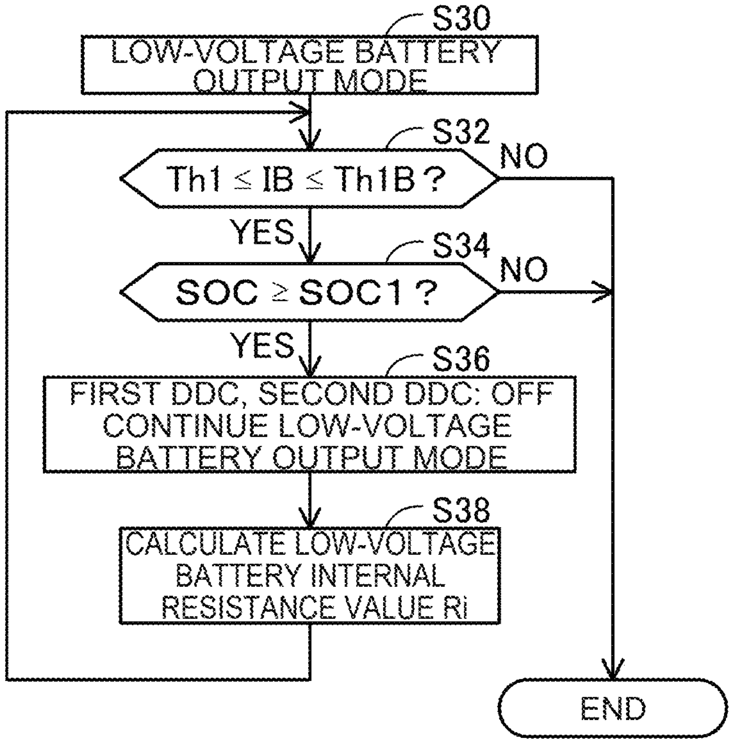
FIG. 4 is a flowchart illustrating a series of processes of a low-voltage battery output mode executed by the control device 30 in the electric power supply system 2 in the first embodiment.

With reference to FIG. 4, description is given of a series of processes performed at the time of execution of the low-voltage battery output mode executed by the control device 30 in the electric power supply system 2 of the first embodiment. When the low-voltage battery output mode is executed (S30), the control device 30 determines whether or not an output current value (IB) of the low-voltage battery 12 is equal to or more than the first current value and equal to or less than the second current value based on a detection value transmitted from the current sensor 50C (S32). When the output current value of the low-voltage battery 12 is not equal to or more than the first current value and equal to or less than the second current value ($IB < Th1$ or $IB > Th1B$) (S32: No), the control device 30 ends the series of process procedures of the low-voltage battery output mode illustrated in FIG. 4 (END). Meanwhile, when the output current value of the low-voltage battery 12 is equal to or more than the first current value and equal to or less than the second current value ($Th1 \leq IB \leq Th1B$) (S32: Yes), the control device 30 determines whether or not a state of charge (SOC) of the low-voltage battery 12 is equal to or more than a first state of charge (SOC1) (S34). When the state of charge of the low-voltage battery 12 is less than the first state of charge ($SOC < SOC1$) (S34: No), the control device 30 ends the series of process procedures of the low-voltage battery output mode illustrated in FIG. 4 (END). When the state of charge of the low-voltage battery 12 is equal to or more than the first state of charge ($SOC \geq SOC1$) (S34: Yes), the control device 30 continues the low-voltage battery output mode (S36). Further, the control device 30 calculates the internal resistance value (Ri) of the low-voltage battery 12 based on the current value and the voltage value detected from the current sensor 50C and the voltage sensor provided in the low-voltage battery 12 (S38). After that, the control device 30 returns to step S32 to repeat and execute the series of process procedures of the low-voltage battery output mode illustrated in FIG. 4, thereby performing electric power supply to the electrical load 40 from the low-voltage battery 12.

As illustrated in FIG. 2, FIG. 3, and FIG. 4, in the series of processes executed by the control device 30 of the electric power supply system 2 in the first embodiment, when the total value of the output currents falls within a relatively high region ($Th1B \leq IL < Th2$), the first DDC 20 having high rated electric power is used, and when the total value of the output currents falls within a relatively low region ($IL < Th1$), the second DDC 22 having small rated electric power is used. Further, when the total value of the output currents falls within an intermediate region ($Th1 \leq IL < Th1B$) between those regions, since both of the first DDC 20 and the second DDC 22 are reduced in voltage conversion efficiency, the operations of the first DDC 20 and the second DDC 22 are stopped so that the low-voltage battery output mode (S30) of supplying the electric power to the load from the low-voltage battery 12 is executed. With such a configuration, the voltage conversion efficiency can be improved in a wide region of the output current value in the electric power supply system 2. Further, when a deterioration index of the low-voltage battery 12 falls within a predetermined deterioration range ($Ri \geq Ra$), the execution of the low-voltage battery output mode (S30) is avoided regardless of the total value of the output currents. In this manner, further deterioration of the low-voltage battery 12 can be prevented. It is to be noted that, as illustrated in FIG. 2, in the process procedure of step S20, when the total value of the output currents is equal to or less than a fourth current value (Th0) that is further lower than the first current value (Th1), instead of using the second DDC 22, the mode may be switched to the low-voltage battery output mode (S30). With such a configuration, even when the total value of the output currents falls within a very low region ($IL \leq Th0$) in which the voltage conversion efficiency is reduced even when the second DDC is used, the reduction in voltage conversion efficiency can be avoided.

Second Embodiment

Figure 5:
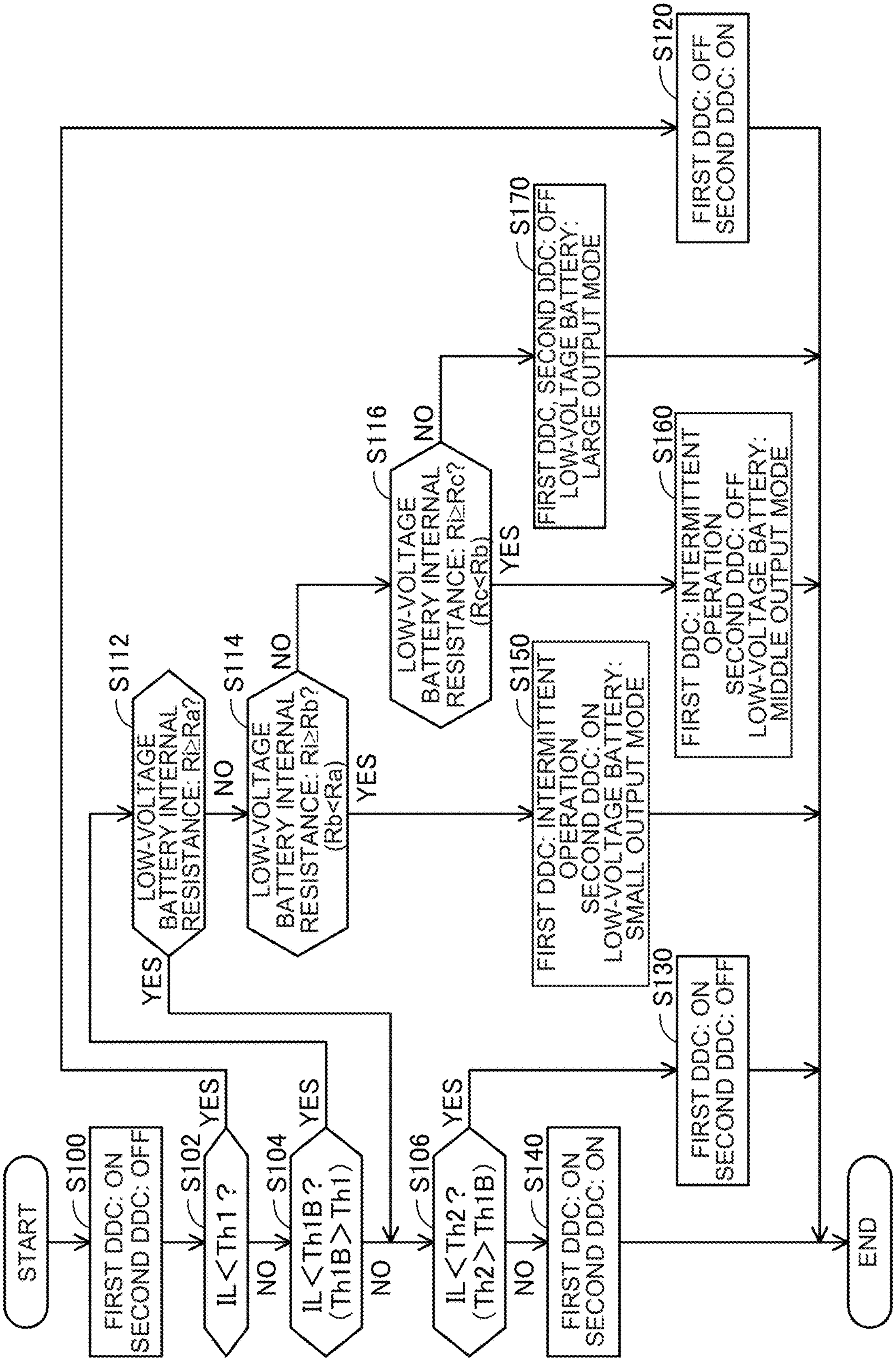
FIG. 5 is a flowchart illustrating a series of processes executed by the control device 30 in the electric power supply system 2 in a second embodiment.
Figure 6A:
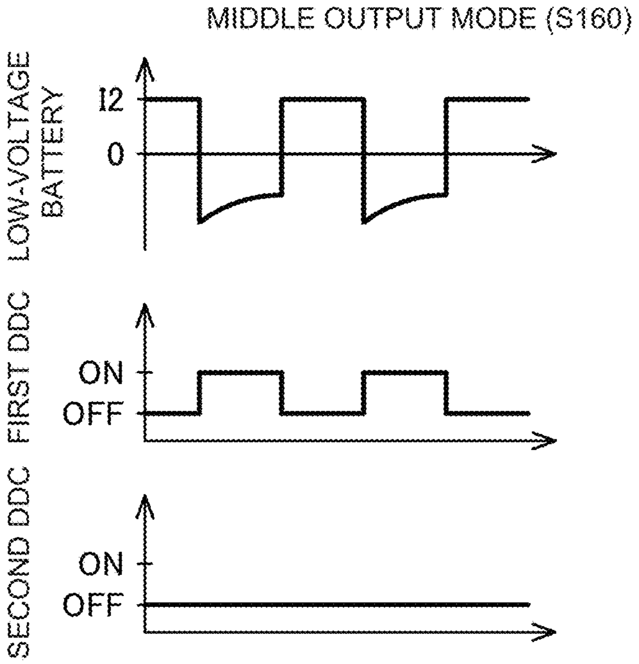
FIG. 6A is a graph illustrating an output current of a low-voltage battery 12 and operation states of the first converter 20 and the second converter 22 in a fourth operation mode in the second embodiment.
Figure 6B:
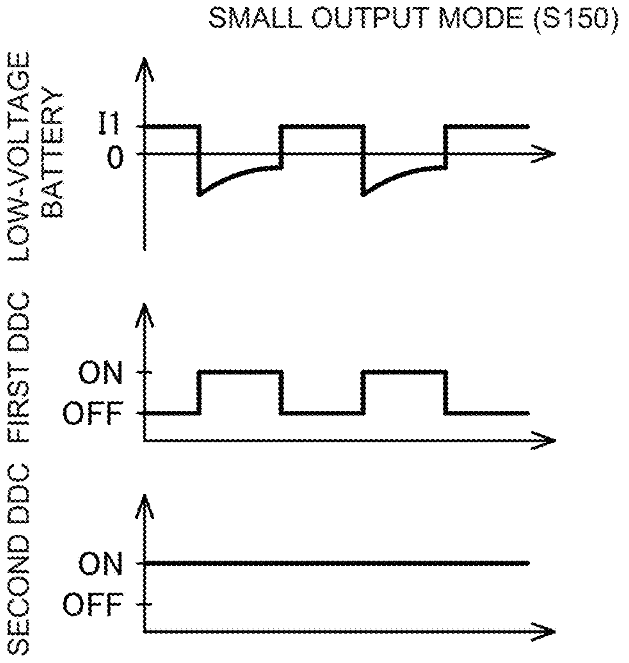
FIG. 6B is a graph illustrating the output current of the low-voltage battery 12 and the operation states of the first converter 20 and the second converter 22 in a fifth operation mode in the second embodiment.

With reference to FIG. 5, FIG. 6A, and FIG. 6B, description is given of an electric power supply system of a second embodiment. The electric power supply system of this embodiment is changed from the electric power supply system 2 of the first embodiment in the content of processes executed by the control device 30. That is, the control device 30 in this embodiment is configured to execute a series of processes illustrated in FIG. 5 in place of the series of processes illustrated in FIG. 3. Regarding other points, the electric power supply system of this embodiment has the same configuration as the electric power supply system 2 of the first embodiment illustrated in FIG. 1. That is, the electric power supply system of this embodiment also includes the high-voltage battery 10, the low-voltage battery 12, the first DDC 20, the second DDC 22, the control device 30, the electrical load 40, and the current sensors 50A, 50B, 50C (see FIG. 1). Configurations and functions of those components are the same as those described in the first embodiment, and redundant description is avoided here.

In the electric power supply system of this embodiment as well, the control device 30 is configured to start the series of processes illustrated in FIG. 5 at the time of supplying electric power to the electrical load 40 from the high-voltage battery 10 of the electric power supply system 2. First, the electric power supply system starts electric power supply to the electrical load 40 while performing voltage conversion of the electric power output from the high-voltage battery 10 by operating the first DDC 20 (S100). After that, the control device 30 determines whether or not the total value (IL) of the output currents of the first DDC 20 and the second DDC 22 is less than the first current value (Th1) (S102). When the total value of the output currents of the first DDC 20 and the second DDC 22 is less than the first current value (IL<Th1) (S102: Yes), the control device 30 stops the operation of the first DDC 20, and starts the operation of the second DDC 22 to start electric power supply to the electrical load 40 while performing voltage conversion of the electric power output from the high-voltage battery 10 (S120).

Meanwhile, when the total value of the output currents of the first DDC 20 and the second DDC 22 is equal to or more than the first current value (IL≥Th1) (S102: No), the control device 30 determines whether or not the total value of the output currents of the first DDC 20 and the second DDC 22 is less than the second current value (Th1B) (S104). Here, as described above in the first embodiment, Th1B>Th1 is satisfied. When the total value of the output currents of the first DDC 20 and the second DDC 22 is less than the second current value (IL<Th1B) (S104: Yes), the control device 30 determines whether or not the internal resistance value (Ri) of the low-voltage battery 12 is equal to or more than the first resistance value (Ra) (S112). When the internal resistance value of the low-voltage battery 12 is equal to or more than the first resistance value (Ri≥Ra) (S112: Yes), the control device 30 advances the process to the process of step S106 described in the following paragraph. When the internal resistance value of the low-voltage battery 12 is less than the first resistance value (Ri<Ra) (S112: No), the control device 30 determines whether or not the internal resistance value (Ri) of the low-voltage battery 12 is equal to or more than a second resistance value (Rb) (S114). It is to be noted that the second resistance value is set to be smaller than the first resistance value described in the paragraph above (that is, Rb<Ra). When the internal resistance value (Ri) of the low-voltage battery 12 is equal to or more than the second resistance value (Rb) (Ri≥Rb) (S114: Yes), the control device 30 operates the second DDC 22 and intermittently operates the first DDC 20 to start execution of a small output mode of outputting the electric power at an eleventh current value (I1) or less from the low-voltage battery 12 (S150).

When the internal resistance value of the low-voltage battery 12 is less than the second resistance value (Ri<Rb) (S114: No), the control device 30 determines whether or not the internal resistance value (Ri) of the low-voltage battery 12 is equal to or more than a third resistance value (Rc) (S116). It is to be noted that the third resistance value is set to a value that is further lower than the second resistance value described in the paragraph above (that is, Rc<Rb). When the internal resistance value of the low-voltage battery 12 is equal to or more than the third resistance value (Ri≥Rc) (S116: Yes), the control device 30 intermittently operates the first DDC 20 without operating the second DDC 22 to start execution of a middle output mode of outputting the electric power at a twelfth current value (I2) or less from the low-voltage battery 12 (S160). It is to be noted that, as illustrated in FIG. 6A and FIG. 6B, the twelfth current value (I2) is set to be larger than the eleventh current value (I1) (that is, I2>I1). Further, when the internal resistance value of the low-voltage battery 12 is less than the third resistance value (Ri<RC) (S116: No), similarly to step S30 in the first embodiment, the control device 30 stops the operations of the first DDC 20 and the second DDC 22 to start a large output mode of supplying the electric power to the electrical load 40 by causing the low-voltage battery 12 to output the electric power at a current value of the twelfth current value or more (S170).

Meanwhile, when the total value of the output currents of the first DDC 20 and the second DDC 22 is equal to or more than the second current value (IL>Th1B) (S104: No), the control device 30 determines whether or not the total value of the output currents of the first DDC 20 and the second DDC 22 is less than the third current value (Th2) (S106). Here, as described above in the first embodiment, Th2>Th1B is satisfied. When the total value of the output currents of the first DDC 20 and the second DDC 22 is less than the third current value (IL<Th2) (S106: Yes), the control device 30 continues the operation of the first DDC 20 to continue the electric power supply to the electrical load 40 while performing voltage conversion of the electric power output from the high-voltage battery 10 (S130). Further, when the total value of the output currents of the first DDC 20 and the second DDC 22 is equal to or more than the third current value (IL≥Th2) (S106: No), the control device 30 operates both of the first DDC 20 and the second DDC 22 to supply the electric power to the electrical load 40 while performing voltage conversion of the electric power output from the high-voltage battery 10 (S140). When the process of each of steps S120, S130, S140, S150, S160, S170 is started, the electric power supply system in the second embodiment ends the series of process procedures illustrated in FIG. 5 (END). Further, after the series of process procedures illustrated in FIG. 5 are ended (END), the electric power supply system in the second embodiment may restart the series of process procedures illustrated in FIG. 5 again from step S102.

With the configuration of the second embodiment described above, the effect of improving the voltage conversion efficiency in the electric power supply system 2 described in the first embodiment can be further enhanced. That is, in a case where the total value of the output currents falls within an output current region (Th1≤IL<Th1B) in which the voltage conversion efficiencies of the first DDC 20 and the second DDC 22 are reduced, when the degree of deterioration of the low-voltage battery 12 is relatively small (Rc≤Ri<Rb), the middle output mode (S160) is selected. In the middle output mode, the first DDC 20 is intermittently operated so that, even when the total value of the output currents falls within the intermediate region (Th1≤IL<Th1B), the first DDC 20 can be operated at an operation point having a high voltage conversion efficiency. At this time, the low-voltage battery 12 is complementarily discharged in accordance with the intermittent operation of the first DDC 20. Thus, a required current is supplied to the electrical load 40. Meanwhile, when the degree of deterioration of the low-voltage battery 12 is a middle degree (Rb≤Ri<Ra), the small output mode (S150) is selected. In the small output mode, the first DDC 20 is intermittently operated while the second DDC 22 is operated. That is, as compared to the middle output mode, in the small output mode, the second DDC 22 is further operated. The discharge current of the low-voltage battery 12 is reduced by the amount of the current output from the second DDC 22, and hence further deterioration of the low-voltage battery 12 is prevented. It is to be noted that the middle output mode (S160) and the small output mode (S150) described in the second embodiment respectively correspond to the fourth operation mode and the fifth operation mode described in the paragraphs above.

FIG. 6A and FIG. 6B illustrate graphs of the temporal change of the output current value of the low-voltage battery 12 and the operation states in the temporal change of the first DDC 20 and the second DDC 22 at the time of execution of the small output mode (S150) and the middle output mode (S160) in the second embodiment. The graphs shown in FIG. 6A represent the temporal change of the output current value of the low-voltage battery 12 and the operation states in the temporal change of the first DDC 20 and the second DDC 22 at the time of execution of the middle output mode of step S160 in the second embodiment. Further, the graphs shown in FIG. 6B represent the temporal change of the output current value of the low-voltage battery 12 and the operation states in the temporal change of the first DDC 20 and the second DDC 22 at the time of execution of the small output mode of step S150 in the second embodiment. Moreover, when the small output mode (S150) and the middle output mode (S160) illustrated in FIG. 5 are executed, similarly to the low-voltage battery output mode of the first embodiment illustrated in FIG. 4, whether or not to continue each output mode may be determined after the determination of the output current value of the low-voltage battery 12 and the determination of the state of charge of the low-voltage battery 12 are performed.

In the first embodiment and the second embodiment described above, in steps S20, S40, S120, S130, when there is a deterioration determination request of the low-voltage battery 12, the control device 30 may use the DDC that is not operated during execution of each process to repeatedly charge and discharge the low-voltage battery 12 and calculate the internal resistance value. In this manner, the accuracy of the deterioration determination process for the low-voltage battery 12 can be improved. Specifically, when the second DDC 22 is operated to supply the electric power to the electrical load 40 without operating the first DDC 20, as in step S20 of the first embodiment and step S120 of the second embodiment, the deterioration determination process may be performed by repeatedly performing charging and discharging between the first DDC 20 and the low-voltage battery 12 and calculating the internal resistance value based on the output current value and the output voltage value of the low-voltage battery 12 detected at this time. Further, when the first DDC 20 is operated to supply the electric power to the electrical load 40 without operating the second DDC 22, as in step S40 of the first embodiment and step S130 of the second embodiment, the deterioration determination process may be performed by repeatedly performing charging and discharging between the second DDC 22 and the low-voltage battery 12 and calculating the internal resistance value based on the output current value and the output voltage value of the low-voltage battery 12 detected at this time. As described above, when the deterioration determination process as described above is performed in steps S20, S40, S120, S130 in the first embodiment and the second embodiment, the DDC that is not in use is additionally operated so that a stable current can be supplied to the low-voltage battery 12 regardless of the variation in power consumption caused by the electrical load 40. In this manner, the internal resistance of the low-voltage battery 12 can be correctly calculated, and the degree of deterioration of the low-voltage battery 12 can be accurately determined.

Further, in the first embodiment and the second embodiment, the high-voltage battery 10 is configured by stacking and disposing a plurality of secondary battery cells. The nominal voltage value may be a value such as 400 volts or 600 volts. As another embodiment, the high-voltage battery 10 may be configured by connecting in series a plurality of batteries each having a nominal voltage of 200 volts or 300 volts, for example. In this case, each of the batteries connected in series may be connected in parallel with each of the first DDC 20 and the second DDC 22. With such a configuration, the voltage drop amount of the electric power supplied from each battery can be reduced, and the electric power loss can be further reduced.

Further, as another mode for carrying out this embodiment, a power generation device such as a solar panel may be connected to the electrical load 40 of the electric power supply system. With such a configuration, the voltage of the electric power generated by the solar panel can be boosted by the first DDC 20 or the second DDC 22, and the electric power can be supplied to the high-voltage battery 10 to charge the high-voltage battery 10.

While specific examples of the technique disclosed in the present specification have been described above in detail, the specific examples are merely illustrative and place no limitation on the scope of the claims. The technique described in the scope of claims also encompasses various changes and modifications to the specific examples exemplified above. The technical elements described in the present specification and the drawings provide technical utility alone or as various combinations, and are not limited to the combinations described in the claims as filed. Further, the techniques exemplified in the present specification and the drawings are able to achieve a plurality of objectives simultaneously and have technical utility by achieving one of the objectives.

What is claimed is:

1. An electric power supply system for supplying electric power to a load, the electric power supply system comprising:

a high-voltage battery;

a low-voltage battery having a nominal voltage lower than a nominal voltage of the high-voltage battery, the low-voltage battery being electrically connected to the load;

a first converter electrically connected between the high-voltage battery and the low-voltage battery, the first converter being configured to perform voltage conversion between the high-voltage battery and the low-voltage battery;

a second converter electrically connected between the high-voltage battery and the low-voltage battery, the second converter being configured to perform voltage conversion between the high-voltage battery and the low-voltage battery, the second converter having rated electric power lower than rated electric power of the first converter; and a control device that controls operations of the first converter and the second converter, wherein:

the control device is configured to selectively execute a plurality of operation modes depending on a total value of output currents of the first converter and the second converter; and the operation modes include:

a first operation mode that is selectable when the total value of the output currents falls within a first current range, the first operation mode being an operation mode in which only the first converter supplies the electric power;

a second operation mode that is selectable when the total value of the output currents falls within a second current range that is lower than the first current range, the second operation mode being an operation mode in which only the second converter supplies the electric power; and a third operation mode that is selectable when the total value of the output currents falls within a third current range positioned between the first current range and the second current range, the third operation mode being an operation mode in which electric power supply from the first converter and the second converter is not performed, wherein the control device is configured to prohibit execution of the third operation mode regardless of the total value of the output currents when a deterioration index of the low-voltage battery falls within a predetermined deterioration range.

2. The electric power supply system according to claim 1, wherein:

the operation modes further include:

a fourth operation mode that is selectable when the total value of the output currents falls within the third current range, the fourth operation mode being an operation mode in which only the first converter intermittently supplies the electric power; and a fifth operation mode that is selectable when the total value of the output currents falls within the third current range, the fifth operation mode being an operation mode in which the second converter supplies the electric power and the first converter intermittently supplies the electric power; and the control device is configured to execute any one of the fourth operation mode and the fifth operation mode depending on a degree of deterioration indicated by the deterioration index when the deterioration index of the low-voltage battery falls within the deterioration range.

3. The electric power supply system according to claim 1, wherein:

the control device is configured to execute a deterioration determination process of calculating any one or more of an internal resistance of the low-voltage battery and a capacitance of the low-voltage battery as the deterioration index of the low-voltage battery;

the control device is configured to further operate the second converter when the deterioration determination process is executed during execution of the first operation mode to supply a charging current or a discharging current to the low-voltage battery; and the control device is configured to further operate the first converter when the deterioration determination process is executed during execution of the second operation mode to supply the charging current or the discharging current to the low-voltage battery.

* * * * *